(12) United States Patent
Shyam et al.

(10) Patent No.: US 9,141,449 B2
(45) Date of Patent: Sep. 22, 2015

(54) MANAGING REMOTE PROCEDURE CALLS WHEN A SERVER IS UNAVAILABLE

(75) Inventors: Nagaraj Shyam, Cupertino, CA (US); Craig Harmer, San Francisco, CA (US); Ken Beck, Morgan Hill, CA (US)

(73) Assignee: Symantec Corporation, Mountain View, CA (US)

( * ) Notice: Subject to any disclaimer, the term of this patent is extended or adjusted under 35 U.S.C. 154(b) by 1083 days.

(21) Appl. No.: 12/610,049

(22) Filed: Oct. 30, 2009

(65) Prior Publication Data

US 2011/0107358 A1 May 5, 2011

(51) Int. Cl.
*G06F 9/54* (2006.01)
*G06F 9/50* (2006.01)

(52) U.S. Cl.
CPC .............. *G06F 9/547* (2013.01); *G06F 9/5027* (2013.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 5,187,787 A * | 2/1993 | Skeen et al. | ................. | 719/314 |
| 5,497,463 A * | 3/1996 | Stein et al. | ................. | 709/203 |
| 5,513,314 A * | 4/1996 | Kandasamy et al. | ........ | 714/6.31 |
| 5,781,703 A * | 7/1998 | Desai et al. | ..................... | 706/50 |
| 5,828,833 A * | 10/1998 | Belville et al. | .................. | 726/11 |
| 5,987,621 A * | 11/1999 | Duso et al. | ................... | 714/4.11 |
| 6,367,029 B1* | 4/2002 | Mayhead et al. | ................. | 714/2 |
| 6,385,643 B1* | 5/2002 | Jacobs et al. | .................. | 709/203 |
| 6,718,486 B1* | 4/2004 | Roselli et al. | ................... | 714/41 |
| 6,950,848 B1* | 9/2005 | Yousefi'zadeh | .............. | 709/203 |
| 7,290,056 B1* | 10/2007 | McLaughlin, Jr. | ............ | 709/230 |
| 7,406,692 B2* | 7/2008 | Halpern et al. | ................ | 718/105 |
| 2001/0000194 A1* | 4/2001 | Sequeira | .......................... | 725/39 |
| 2001/0000812 A1* | 5/2001 | Waldo et al. | .................. | 709/225 |
| 2002/0078174 A1* | 6/2002 | Sim et al. | ...................... | 709/219 |
| 2002/0116485 A1* | 8/2002 | Black et al. | ................... | 709/223 |
| 2002/0120697 A1* | 8/2002 | Generous et al. | ............. | 709/206 |
| 2002/0152293 A1* | 10/2002 | Hahn et al. | .................... | 709/223 |
| 2003/0009552 A1* | 1/2003 | Benfield et al. | ............... | 709/224 |
| 2003/0009553 A1* | 1/2003 | Benfield et al. | ............... | 709/224 |
| 2003/0014480 A1* | 1/2003 | Pullara et al. | .................. | 709/203 |
| 2003/0018927 A1* | 1/2003 | Gadir et al. | ........................ | 714/4 |
| 2003/0028514 A1* | 2/2003 | Lord et al. | ........................ | 707/1 |
| 2003/0093585 A1* | 5/2003 | Allan | ............................ | 709/330 |
| 2003/0120811 A1* | 6/2003 | Hanson et al. | ................ | 709/245 |
| 2003/0126202 A1* | 7/2003 | Watt | ................................ | 709/203 |
| 2003/0126265 A1* | 7/2003 | Aziz et al. | ...................... | 709/227 |
| 2003/0204647 A1* | 10/2003 | Jacobs et al. | .................. | 709/330 |
| 2003/0225889 A1* | 12/2003 | Moutafov | ...................... | 709/227 |
| 2004/0030739 A1* | 2/2004 | Yousefi'zadeh | .............. | 709/201 |
| 2004/0059789 A1* | 3/2004 | Shum | ............................ | 709/206 |
| 2004/0153558 A1* | 8/2004 | Gunduc et al. | ................ | 709/229 |
| 2004/0215792 A1* | 10/2004 | Koning et al. | ................ | 709/229 |
| 2004/0249944 A1* | 12/2004 | Hosking et al. | ............... | 709/225 |
| 2005/0132384 A1* | 6/2005 | Morrison et al. | ............. | 719/312 |
| 2006/0064486 A1* | 3/2006 | Baron et al. | ................... | 709/224 |
| 2007/0174428 A1* | 7/2007 | Lev Ran et al. | ............... | 709/218 |
| 2007/0226359 A1* | 9/2007 | Gunduc et al. | ................ | 709/229 |
| 2007/0255822 A1* | 11/2007 | Thiel et al. | ..................... | 709/224 |
| 2008/0005196 A1* | 1/2008 | Beck | ............................ | 707/203 |

* cited by examiner

*Primary Examiner* — Shih-Wei Kraft
(74) *Attorney, Agent, or Firm* — Wilmer Cutler Pickering Hale and Dorr LLP

(57) ABSTRACT

A server node can monitor the status of servers in a server cluster. The node may receive an alert indicating that a server in the server cluster is unavailable. In response to the alert, the node can send instructions that cause pending remote procedure call requests to be canceled and then reissued to another server in the server cluster instead of to the first server.

14 Claims, 6 Drawing Sheets

100

110

MANAGING REMOTE PROCEDURE CALLS WHEN A SERVER IS UNAVAILABLE

BACKGROUND

As generally known, a remote procedure call (RPC) allows a subroutine or procedure to execute in another address space (typically on another computer—a server, for example—on a shared network). A client initiates an RPC request (e.g., for data) by sending a message to a remote server in order to execute the specified subroutine or procedure. Data from the remote server is then typically returned to the client.

A problem with remote procedure calls is that the RPC request can fail because of network problems that are unknown to the client (e.g., a transmission problem). Consequently, the client may not know whether or not the RPC request was actually received or invoked.

In an attempt to address this problem, a timeout period is associated with each RPC request. If a timeout period associated with a particular RPC request expires before a response to that RPC request is received, then the client may reissue the RPC request and restart the timeout period. The timeout periods are usually tens of seconds (e.g., 30 seconds or more) in length. Actually, RPC requests may have two types of timeout periods, one for retrying an RPC request, and one for failing an RPC request. As such, an RPC request may not fail until after it has been retried several times, which may be on the order of minutes.

The server to which the client is sending the RPC request may be inoperative but, as mentioned above, the client may not be aware of that. Hence, the client will continue to send RPC requests to that server until either a network administrator (human or machine), or the client itself, realizes that the server is inoperative. Because of the length of the timeout period, it may take a relatively long time for this realization to occur, which can significantly affect the client's performance in a negative way. If the client has multiple outstanding RPC requests, the effect on performance can be even more severe, because the client typically must wait for all of the RPC requests to time out. Moreover, execution on the client can be further delayed while the client waits until it is assigned to an alternate server that can handle the client's RPC requests.

In cluster file systems in particular, server node failures are traditionally handled by having network file system clients wait for their submitted RPC requests to time out and then retry the requests until the cluster server network address is taken over by a healthy node. This typically results in poor response times under server node failures because, as noted above, the client may have to wait for several outstanding requests to the failed server node to time out. The client also has to wait for the cluster network address to be taken over by a healthy server node before retrying requests. In addition, the client typically has to use a larger timeout value for its remote procedure call requests, to give the server sufficient time to reply and to avoid spurious timeouts that can further worsen the client's performance.

SUMMARY

In one embodiment, a server node can monitor the status of servers in a server cluster. The server cluster can include metadata servers that are coupled to data servers via a local area network. The server node can determine whether a server in the server cluster is unavailable (e.g., inoperative). The server node may receive an alert indicating that a server in the server cluster is unavailable. The alert may be received from a client device served by the first server, or the alert may be received from one of the servers in the server cluster. In any case, the node can instruct a client to cancel pending remote procedure call (RPC) requests and reissue them to another server in the server cluster instead of to the unavailable server.

In one embodiment, before receiving the alert, the server node may decide to proactively redirect the pending RPC requests to another server in the server cluster (e.g., for load balancing).

In one embodiment, the alert indicates that the first server has not responded to a health check message that has a timeout period that is shorter than a timeout period for the pending RPC requests.

In one embodiment, the alert indicates that the first server has stopped sending heartbeat messages that have a timeout period that is shorter than a timeout period for the pending RPC requests.

In another embodiment, a client can send a remote procedure call (RPC) request to a first server. A first timeout period is associated with the RPC request. The client can also send a heartbeat message to the first server. A second timeout period that is shorter than the first timeout period is associated with the heartbeat message. If a response to the heartbeat message is not received within the second timeout period, then the client can cancel the RPC request to the first server before the first timeout period expires. After canceling the RPC request, the client can resend the RPC request to a healthy second server instead of to the first server. In one embodiment, all pending RPC requests are canceled and resent. In one embodiment, the client can access a list of servers and select the second server from that list.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
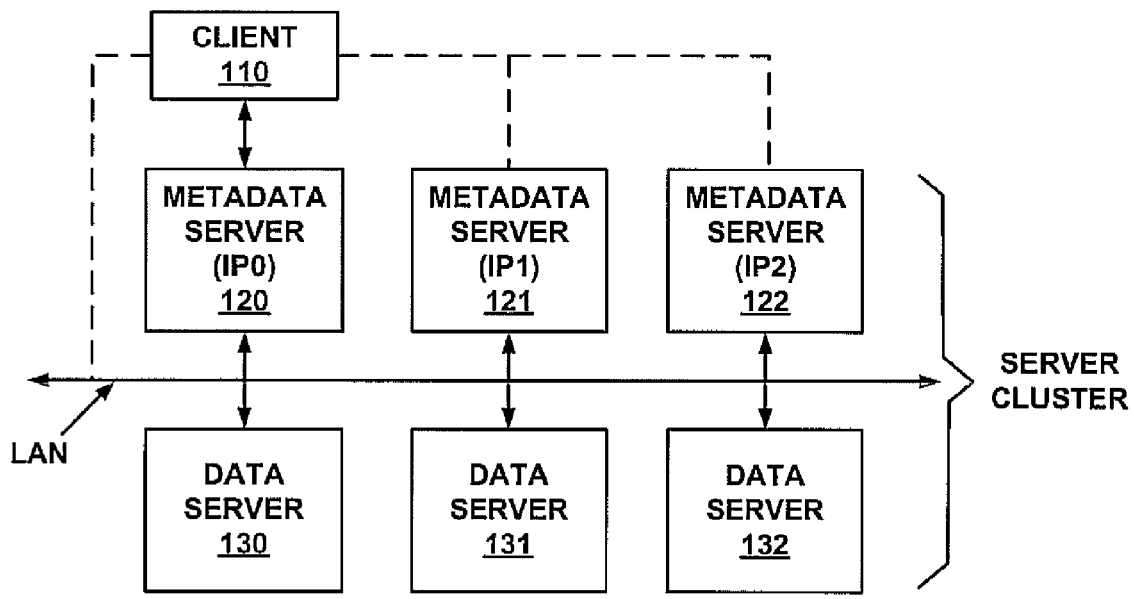
FIG. 1 is a block diagram depicting an example of a network upon which embodiments according to the invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sending," "canceling," "resending," "notifying," "receiving," "accessing," "selecting," "maintaining," "terminating," "monitoring," "instructing," "pinging," "making a decision," or the like, refer to actions and processes (e.g., flowcharts 800 and 900 of FIGS. 8 and 9, respectively) of a computer system or similar electronic computing device or processor (e.g., system 210 of FIG. 3). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above can also be included within the scope of computer-readable storage media.

FIG. 1 is a block diagram depicting a network 100 upon which embodiments of the present disclosure may be used. The network 100 may be referred to as cluster file system, network file system, or storage area network. In general, the network 100 is a network in which a set of computers (e.g., the system 210 of FIG. 3) can perform input/output (I/O) operations using, in one embodiment, an object-based file system that utilizes Internet Protocol (IP)-based storage and RPCs.

In the example of FIG. 1, the network 100 includes metadata servers 120, 121, and 122 (which may be referred to herein as "server nodes," and data servers 130, 131, and 132. The data servers 130-132 may be referred to as object storage devices (OSDs). The metadata servers 120-122 and the data servers 130-132 can communicate with each other via a local area network (LAN). There may be any number of metadata servers and any number of data servers in the network 100.

A unique address is associated with each of the metadata servers 120-122. In one embodiment, a server in the cluster may be designated as the access point through which communications between clients and the cluster are channeled. In one embodiment, the address is an IP address (e.g., IP0, IP1, and IP2). A client 110 is given an IP address, which it uses to contact the metadata server to which it is assigned, either through the LAN or more directly. In the example of FIG. 1, IP0 for metadata server 120 is provided to the client 110.

As described further below, various mechanisms can be used to determine whether or not the metadata server 120 assigned to the client 110 is inoperative or unavailable. If the metadata server 120 should become inoperative or be removed from service, for example, then the client 110 can be assigned an address for a different metadata server, or for multiple other metadata servers, in the server cluster. Alternatively, the client 110 can have or be provided with a list (e.g., an ordered list) of addresses; if the metadata server 120 becomes inoperative or removed from service, for example, then the client 110 can simply select the next address or addresses on the list. The client 110 also may be assigned to or may select a different metadata server for reasons other than failover, e.g., for load balancing.

In the example of FIG. 1, the client 110 accesses data stored in the data servers 130-132 via the metadata server 120. Information about the data (metadata) can be stored on the metadata servers 120-122. The metadata servers 120-122 perform operations such as looking up pathnames, retrieving file sizes, tracking access/update times, and checking permissions. Metadata servers 120-122 are, in general, computers that run server software that performs the above operations and that also can pass out tokens that allow access to the objects on the data servers 130-132 that contain file data.

The data requested by the client 110 may span multiple objects and may be distributed across the data servers 130-132. The data may also be stored redundantly across multiple objects on different data servers.

In general, the metadata servers 120-122 and the data servers 130-132 present a full file system abstraction to the client 110; in other words, the architecture of the network 100 is, in general, transparent to the client 110.

Figure 2:
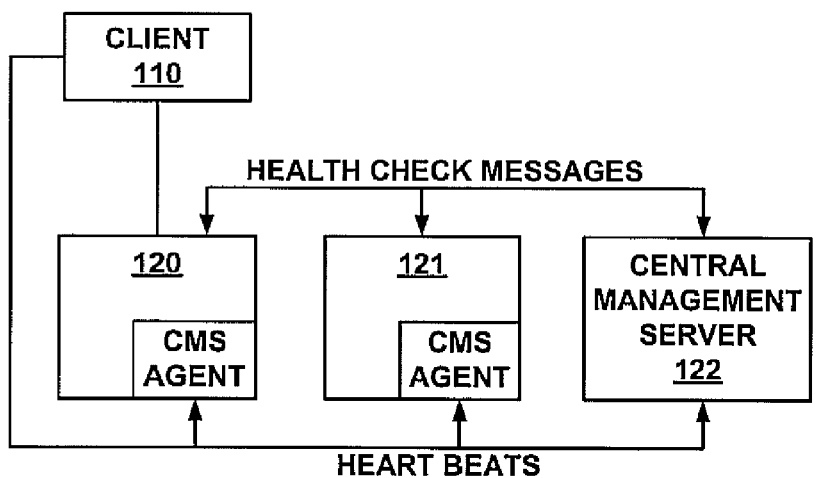
FIG. 2 is a block diagram depicting an example of a network including a central management server according to an embodiment of the invention.

With reference now to FIG. 2, in one embodiment, one of the metadata servers 120-122 (e.g., the metadata server 122) serves as a central management server (CMS), and a CMS agent (or daemon) resides on each of the other metadata servers in the network 100. The role of the central management server can be passed from the metadata server 122 to another server node if, for example, the metadata server 122 should become inoperative or be removed from service. The role of the central management server can be handled by a server other than a metadata server. The central management server may also be referred to as a notification server.

The central management server monitors the "health" of the server nodes in the network 100 via the CMS agents. For example, each CMS agent can supply the central management server with performance information for a respective server node. The performance information can include, but is not limited to, central processor unit (CPU) usage and available bandwidth for load balancing purposes.

Also, in one embodiment, each server 120-122 can emit "heartbeat messages" (also known as pings, iamalive requests, etc.) periodically, (e.g., 100 times per second), either as unicast or broadcast. Another server (e.g., the central management server implemented on one of the metadata servers or on another server) can listen for the heartbeat messages. The client 110 can also monitor the heartbeat messages.

If the central management server fails to detect one or more heartbeats from a particular server, then the central management server assumes that server is inoperative. If another node (e.g., the client 110 or any of the metadata servers 120-122) fails to detect heartbeats from a particular server, then that node can notify the central management server of that circumstance.

Generally, the central management server may wait until six or 16 heartbeats have been missed before declaring a server as inoperative. In that case, the detection period is approximately 60-160 milliseconds. Thus, the detection period associated with heartbeats is relatively short; significantly, the heartbeat detection period is less than the timeout period associated with RPC requests.

In another embodiment, the central management server (e.g., metadata server 122) can issue "health check" messages to each of the other metadata servers 120-121, perhaps on the order of one message per second. In yet another embodiment, the client 110 can issue health check messages to the metadata server that it is assigned to (e.g., metadata server 120). If a server fails to respond to some number (e.g., three or four) of the health check messages sent from a particular issuing device, then that issuing device can notify the central management server of that circumstance. In response, the central management server assumes that server is inoperative. The timeout for each health check message is relatively short; significantly, the timeout period per health check message is less than the timeout period associated with RPC requests.

In one embodiment, the central management server provides the client 110 with address information (e.g., an IP address) for a particular metadata server. That is, when the client 110 initiates a session with the network 100, the central management server can supply the client 110 with the initial IP address it is to use to access the network. The central management server can also supply the client 110 with a new IP address or a list of IP addresses, for failover and load balancing purposes. The client 110 can also contact the central management server during the session, to identify a problem or potential problem with its assigned metadata server, for example.

Thus, the metadata servers 120-122 are set up in a redundant configuration so that if one fails, its role can be assumed by another server in the server cluster. Information required for one metadata server to take the place of another can be stored in the data servers 130-132 in redundant fashion.

Figure 3:
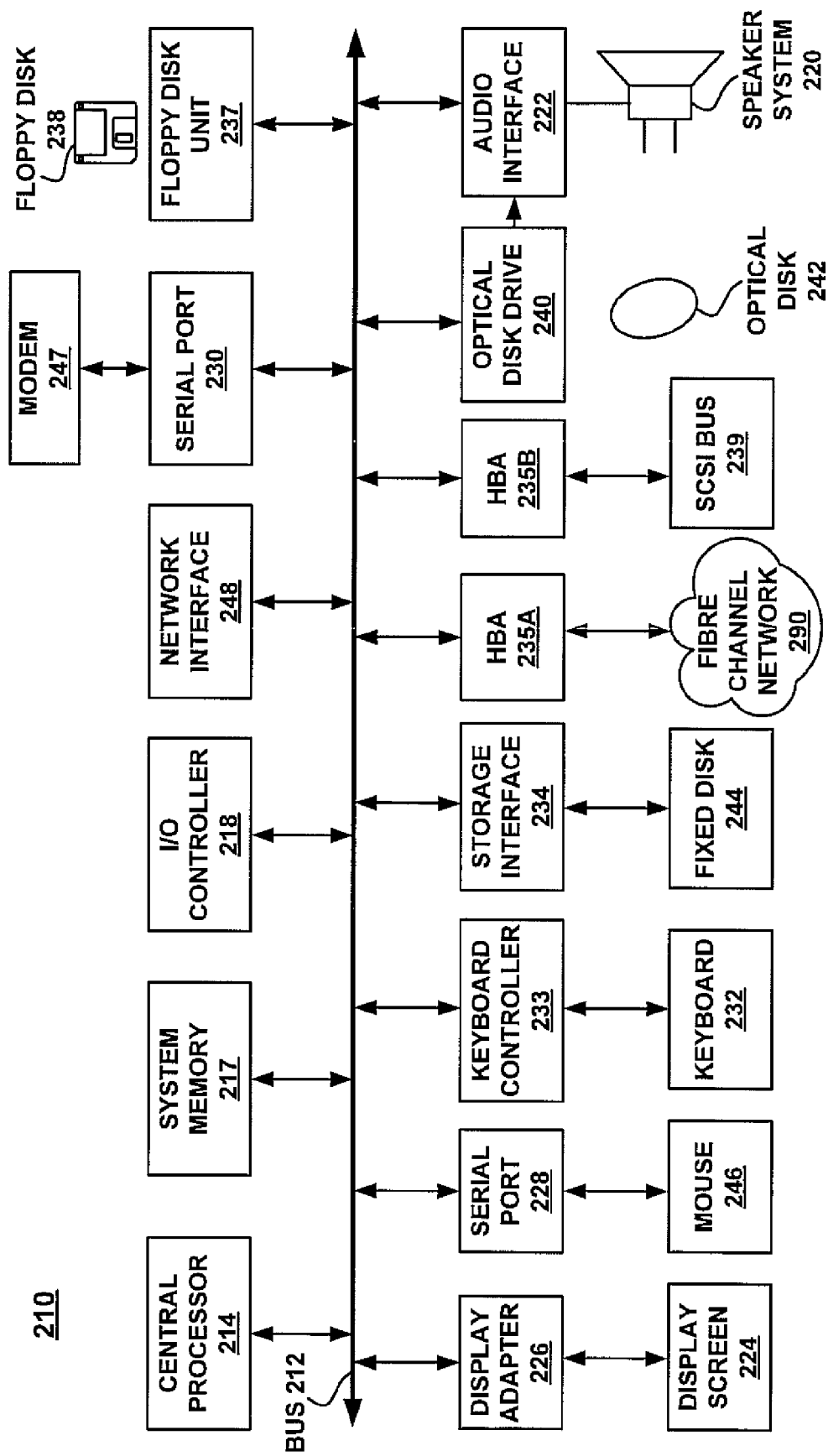
FIG. 3 is a block diagram depicting an example of a computer system upon which embodiments according to the invention can be implemented.

FIG. 3 depicts a block diagram of a computer system 210 suitable for implementing the present disclosure. In the discussion to follow, various and numerous components and elements are described. Various combinations and subsets of those components can be used to implement the devices mentioned in conjunction with FIG. 1. For example, the client 110 may be a full-function computer system that employs many if not all of the features of the computer system 210. However, the metadata servers 120-122 and the data servers 130-132 may utilize only the subset of those features needed to support the functionality provided by those devices. For example, the metadata servers 120-122 and the data servers 130-132 may not need a keyboard or display, and may execute a relatively sparse operating system that supports the functionality of data storage and data access and the management of such functionality.

In the example of FIG. 3, the computer system 210 includes a bus 212 which interconnects major subsystems of the computer system. These subsystems include a central processor 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a floppy disk drive 237 operative to receive a floppy disk 238; a host bus adapter (HBA) interface card 235A operative to connect with a Fibre Channel network 290; an HBA interface card 235B operative to connect to a Small Computer System Interface (SCSI) bus 239; and an optical disk drive 240 operative to receive an optical disk 242. Also included are a mouse 246 (or other point-and-click device, coupled to bus 212 via serial port 228); a modem 247 (coupled to bus 212 via serial port 230); and a network interface 248 (coupled directly to bus 212). The modem 247, network interface 248 or some other method can be used to provide connectivity from each of the nodes 110 and 120 to the network 150 of FIG. 1.

The bus 212 of FIG. 3 allows data communication between the central processor 214 and system memory 217, which may include ROM or flash memory and RAM (not shown), as previously noted. The RAM is generally the main memory into which the operating system and application programs are loaded. The ROM or flash memory can contain, among other code, the Basic Input-Output System (BIOS) which controls basic hardware operation such as the interaction with peripheral components.

Applications resident within the computer system 210 are generally stored on and accessed via a computer-readable storage medium, such as a hard disk drive (e.g., the fixed disk 244), an optical drive (e.g., the optical drive 240), a floppy disk unit 237, or other storage medium. Applications can be in the form of electronic signals modulated in accordance with the application and data communication technology when accessed via network modem 247 or interface 248.

Continuing with reference to FIG. 3, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection, or the like.

Many other devices or subsystems (not shown in FIG. 3) may be connected in a similar manner (e.g., document scanners, digital cameras and so on). Conversely, all of the devices shown in FIG. 3 need not be present to practice the present disclosure. The devices and subsystems can be interconnected in different ways from that shown in FIG. 3.

The operation of a computer system such as that shown in FIG. 3 is readily known in the art and is not discussed in detail in this application. Code to implement the present disclosure can be stored in computer-readable storage media such as one or more of the system memory 217, fixed disk 244, optical disk 242, or floppy disk 238. The operating system provided on the computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 4:
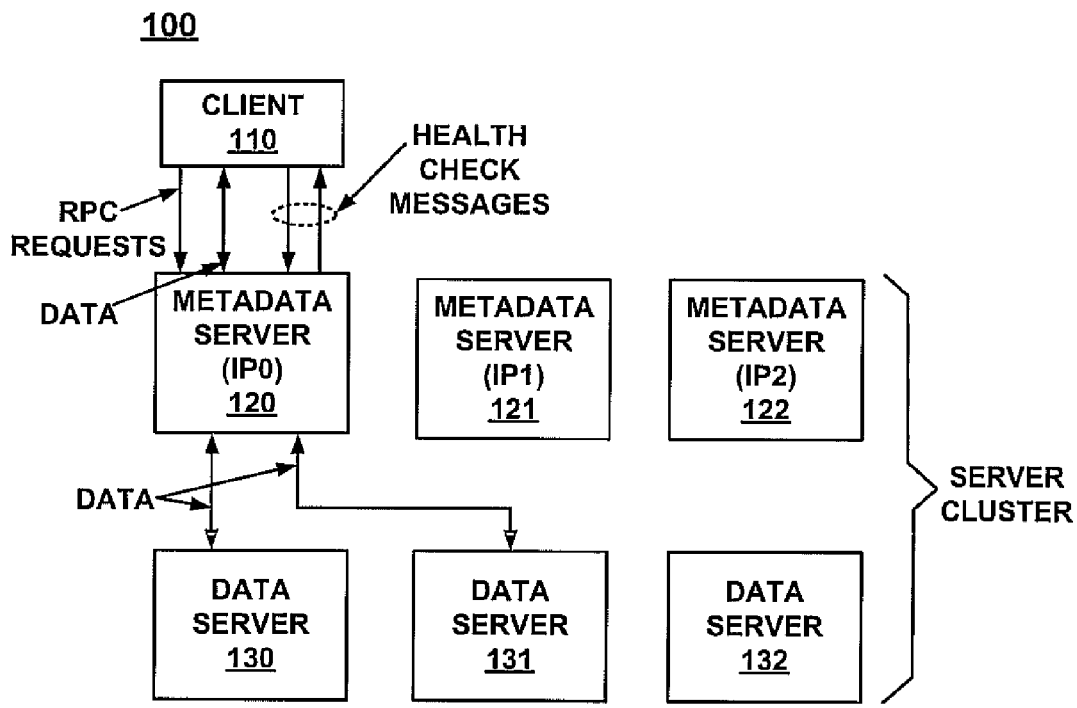
FIG. 4 is a block diagram depicting the use of health check messages sent from a client to a server according to an embodiment of the invention.

With reference now to FIG. 4, to access the file system on the data servers 130-132, the client 110 can issue an RPC request that is sent to the client's assigned metadata server (e.g., metadata server 120). A timeout period (also referred to herein as an RPC timeout period or a first timeout period) is associated with each RPC request; an RPC request will expire (time out) at the end of the timeout period if a response to the RPC request is not received within the designated timeout period, in which case the client 110 can reissue the RPC request. In response to an RPC request, data is retrieved from or sent to one or more of the data servers 130-132 as required, presuming that the metadata server 120 is operating properly.

In one embodiment, the client 110 also sends relatively short and small health check messages to its assigned metadata server 120. A timeout period (also referred to herein as a health check timeout period or a second timeout period) is associated with each health check message; importantly, the timeout period for a health check message is shorter than the timeout period for an RPC request. The health check messages are small in size (e.g., on the order of 32-64 bytes) relative to the sizes of the RPC requests. Furthermore, the time required by the server to process and respond to the health check messages is short compared to the RPC requests. Hence, the roundtrip time of the health check messages (request and response) is very short compared to the roundtrip time of RPC requests and responses.

The assigned metadata server 120 responds to a health check request within the associated timeout period in order to indicate to the client 110 that the server is operative and available to keep the ongoing session alive. Otherwise, from the perspective of the client 110, the metadata server 120 will appear to be inoperative.

As noted above in conjunction with FIG. 2, the health of the metadata servers 120-122 can instead be monitored using heartbeat messages that are sent between the servers, and by health check messages that are sent from a central management server to each of the metadata servers. The health check messages from the client 110 can be used in lieu of those messages or in addition to those messages.

Figure 5:
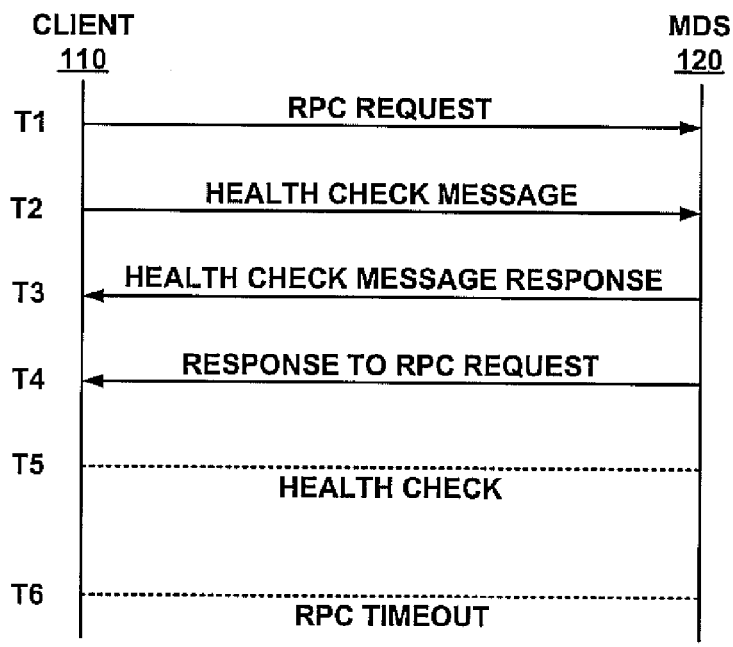
FIG. 5 depicts the relationship between health check messages and RPCs according to an embodiment of the invention.

FIG. 5 depicts an example of a time-based relationship between RPC requests and health check messages for an embodiment in which the client 110 issues both the RPC requests and the health check messages. In the example of FIG. 5, an RPC request is issued by the client 110 at time T1 and is received at the metadata server (MDS) 120. At time T2, a health check message is sent from the client 110 to the metadata server 120. At time T3, a response to the health check message is sent from the metadata server 120 to the client 110. At time T4, a response to the RPC request is sent from the metadata server 120 to the client 110. As described above, the roundtrip time (T3 minus T2) for the health check messages is less than the roundtrip time (T4 minus T1) for the RPC messages.

Also shown in FIG. 5 is a timeout deadline T5 for the health check messages, and a later timeout deadline T6 for the RPC messages. The health check message timeout period is therefore T5 minus T2, which is less than the RPC timeout period of T6 minus T1. That is, a health check message will time out faster than an RPC request.

The relative order of the health check and RPC messages shown in FIG. 5 is only an example for illustrative purposes. That is, for instance, the health check message need not follow the RPC request; health check messages and RPC messages can be nested. Also, multiple health check messages may be sent between RPC requests. Also, there may be multiple pending RPC requests; any number of RPC requests can be issued in parallel before a response to the earliest RPC request is received.

Because of their short roundtrip time, health check messages can be sent serially. That is, a second (later) health check message may not be sent before a response to a first (earlier) health check message is received. However, health check messages can instead be sent in parallel; the second health check message can be sent before a response to the first health check message is received. As noted above, the health check messages may be used by the client 110 to determine whether the metadata server 120 assigned to the client is operative. Thus, sending the second health check message before a response to the first health check message is received provides a mechanism for confirming whether or not the metadata server 120 is inoperative. In other words, if the health check messages are sent serially, then a single missing health check response can trigger an alert indicating that there may be a problem with the metadata server 120. On the other hand, if multiple health check messages are sent in parallel, then a threshold for triggering such an alert can be established. For example, some number of consecutive health check message responses may need to be absent before it can be concluded that the metadata server 120 is apparently inoperative or unavailable. Additional information is provided in conjunction with FIG. 7.

Figure 6:
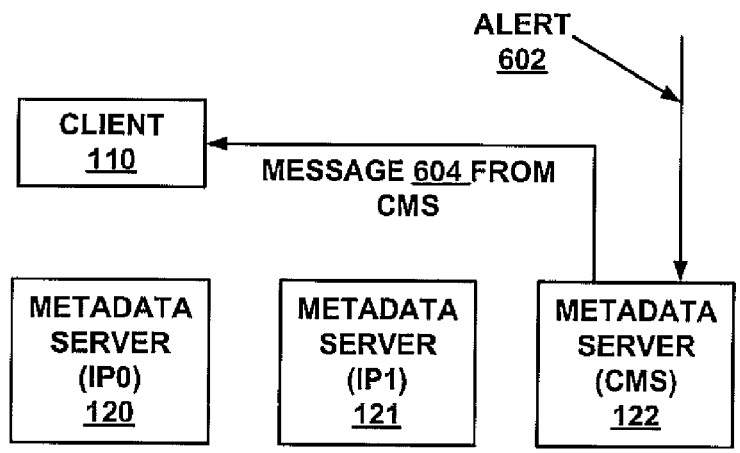
FIG. 6 is a block diagram depicting an example in which a server is inoperative or unavailable according to an embodiment of the invention.

FIG. 6 is a block diagram depicting actions that can be performed if the metadata server assigned to the client 110 (e.g., the metadata server 120) appears to be inoperative or is unavailable, according to one embodiment of the invention. As described above, the client 110 itself can determine that the metadata server 120 may be inoperative using health check messages issued by the client, or other mechanisms such as server-initiated health check messages and server-initiated heartbeats can be used for that purpose.

If a node other than the central management server determines that the metadata server 120 may be inoperative, then that node can send an alert 602 to the central management server. That is, if the client 110 or one of the other metadata servers 121-122 determines that the metadata server 120 is apparently inoperative, then that node can send an alert 602 to the node acting as the central management server. The alert 602 serves as notice to the central management server that either a health check message or an RPC request associated with the metadata server 120 has timed out or that the metadata server 120 has stopped sending heartbeat messages. Given the shorter round trip time and/or shorter timeout period associated with heartbeats and with health check messages compared to RPC requests, it is more likely that an alert 602 will be triggered in response to missing heartbeats or a health check message timeout instead of in response to an RPC timeout. Certainly, in many if not almost all cases, the use of heartbeat and/or health check messages allows the central management server and/or client 110 to learn more quickly that the metadata server 120 assigned to the client is unavailable for some reason.

In response to the alert 602 sent from the client 110 or another server node, the central management server (e.g., the metadata server 122) can optionally make a determination whether the metadata server 120 is indeed inoperative. For example, the central management server can use the heartbeat and health check messages it has been monitoring to determine whether the metadata server 120 is functioning properly or not. The central management server can also directly ping the metadata server 120 to make this determination.

In general, the central management server can maintain a list of server nodes that are currently healthy. While the central management server has the option of determining whether or not the metadata server 120 is indeed inoperative, the central management server will generally take the actions about to be described as the default course of action, in order to avoid affecting the performance of the client 110. Thus, for the purposes of the following discussion of FIG. 6, the metadata server 120 is presumed to be inoperative.

In response to the alert 602, in one embodiment, the central management server sends a message 604 to the client 110. The message 604 is used to instruct the client 110 to redirect pending RPC requests to an alternate (healthy) server node or nodes.

In one embodiment, the client 110 cancels all pending RPC requests in response to heartbeat timeout or in response to an RPC timeout. In another embodiment, the client 110 cancels all pending RPC requests to the metadata server 120 in response to the message 604. Once the client 110 receives information that identifies one or more alternate, healthy server nodes, the client 110 can reissue any pending RPC requests to one or more of those nodes. As described below, the alternate server node or nodes can be identified and selected in a number of different ways.

In one embodiment, the message 604 can include an IP address for each server node that may be used instead of the metadata server 120. The message 604 may identify only a single, healthy server node and an address for that server node, or the message may include such information for multiple server nodes. Alternatively, as described previously herein, the central management server can provide the client 110 with a list (e.g., an ordered list) of other server nodes in the network 100 (FIG. 1) and their addresses when the client initiates a session with the network. In the latter embodiment, the client 110 can select one or more server nodes from that list. In other words, in general, the central management server can point the client 110 to another server node or nodes, or the client can choose one or more server nodes based on information it possesses.

As described previously herein (see the discussion of FIG. 2), the central management server can monitor the performance (health) of each of the other server nodes in the cluster. Hence, the central management server can quickly identify one or more healthy replacement server nodes.

The central management server can also proactively send a message 604 to instruct the client 110 to cancel pending RPC requests and redirect those requests to another server node or nodes. For example, the central management server may send such a message for purposes of load balancing. In other words, the central management server need not wait for an alert 602 in order to trigger a message 604 and assign a different server node or nodes to the client 110. In general, the central management server can send a message 604 and reassign the client 110 to a different server node or nodes at any time, or it can do so specifically in response to an alert message 602 from the client. As noted above, the message 604 can include an address for another server or servers, or the client 110 can select another server or servers from a preexisting list.

Figure 7:
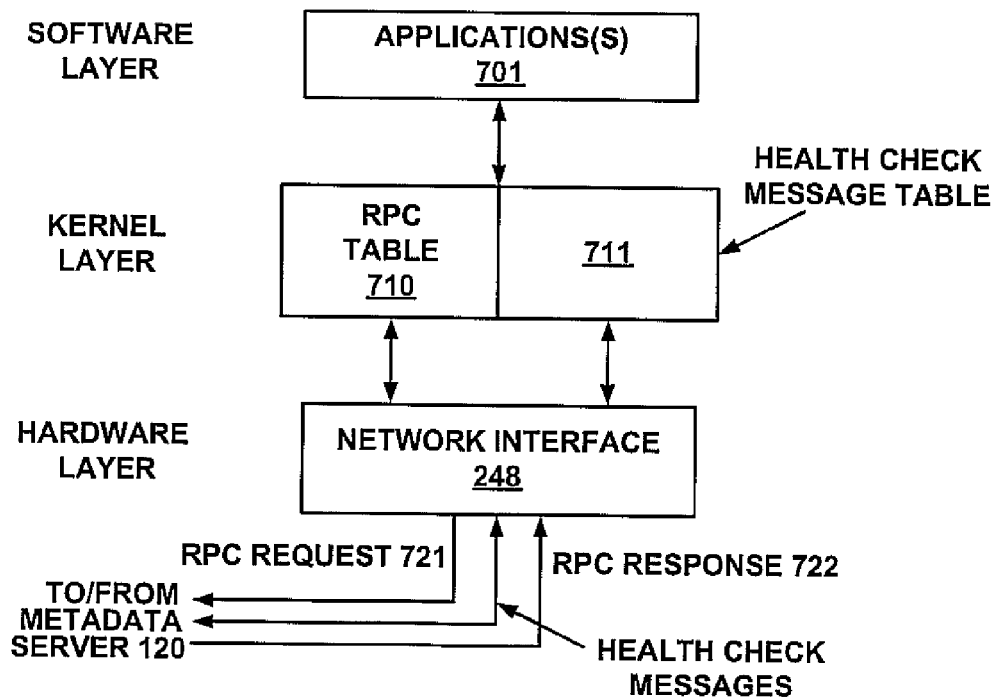
FIG. 7 is a block diagram illustrating an embodiment of a client-implemented process for managing RPCs according to an embodiment of the invention.

FIG. 7 is a block diagram illustrating an embodiment of a client-implemented process for managing heartbeats and remote procedure calls. In the example of FIG. 7, one or more applications 701 are executing in the software layer of the client 110. In general, there may be multiple threads of execution at the client 110 that issue RPC requests for data.

In one embodiment, a list (e.g., an RPC table 710) is used to track RPC requests and responses that are sent from and received by the client 110. Each RPC request can be assigned a unique identifier (ID) to facilitate tracking. When a new RPC request 721 is issued, a corresponding entry in the RPC table 710 is created and is indexed by the ID for that RPC request. The RPC request 721 is then forwarded to the assigned metadata server 120 via network interface 248, for example. The metadata server 120 can access the requested data from the data servers 130-132 (FIG. 1) as previously described herein. When an RPC response 722 with the same ID as the RPC request 721 is received at the network interface 248, the entry indexed by that ID can be cleared from the RPC table 710. The entry corresponding to the RPC request 721 may also be cleared from the table 710 if that RPC request times out.

In a similar manner, a list (e.g., a health check message table 711) can be used to track health check messages sent to and received from the metadata server 120. In one embodiment, health check messages are sent to the metadata server 120 in a serial manner. That is, a first health check message is sent to the metadata server 120, and another health check message is not sent to that server until after a response to the first health check message is received. In such an embodiment, the health check message table 711 may simply include a bit that is set to indicate that there is an outstanding health check message; that bit can be cleared when the corresponding response is received.

In another embodiment, health check messages may be sent to the metadata server 120 in parallel (e.g., the health check messages can be nested). In such an embodiment, a unique ID can be associated with each health check messages, and each health check message can be tracked in a manner similar to the approach just described for RPC requests.

Depending on the implementation, if a response to any health check message is not received (e.g., the health check message times out), or if some number of consecutive health check messages time out, or if an RPC request times out, then an alert message 602 can be generated as described in conjunction with FIG. 6. In one embodiment, when the alert 602 is generated, all pending RPC requests addressed to the assigned metadata server 602 are cleared from the table 710 (that is, they are canceled or terminated). In another embodiment, all pending RPC requests addressed to the assigned metadata server 602 are cleared from the table 710 when the message 604 is received from the central management system.

Figure 8:
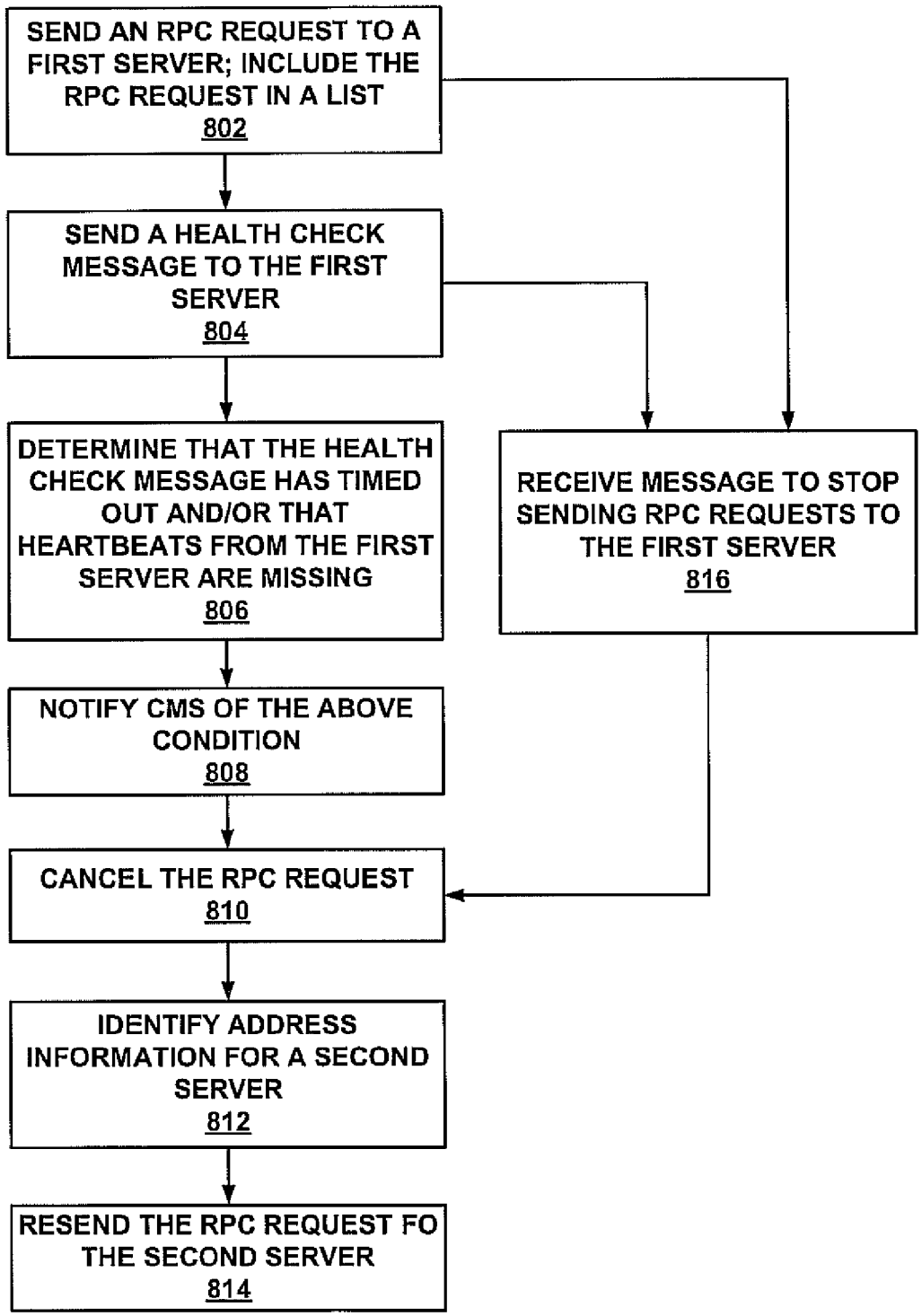
FIG. 8 is a flowchart of a computer-implemented method for managing RPCs according to an embodiment of the invention.

FIG. 8 is a flowchart 800 illustrating an embodiment of a computer-implemented method for managing remote procedure calls. Flowchart 800 can be implemented as computer-executable instructions residing on some form of computer-readable storage medium (e.g., in the system 210 of FIG. 3). More specifically, the method described by the flowchart 800 can be performed by the client 110 or by any of the server nodes 120-122 of FIG. 6 (that is, the method of FIG. 8 is not necessarily performed by the central management server). Not all of the steps included in the flowchart 800 may be performed, and the steps may be performed in a different order than described. Also, although the flowchart 800 is described for single instances of an RPC request and a health check message, it can be readily extended to multiple instances of RPC requests and health check messages.

In block 802 of FIG. 8, with reference also to FIG. 4, an RPC request is sent from the client 110 to a first server (e.g., metadata server 120). The RPC request can be included in a client-maintained list (e.g., RPC table 710 of FIG. 7) for tracking purposes. A first timeout period is associated with the RPC request.

In block 804 of FIG. 8, with reference also to FIG. 4, a health check message is sent from the client 110 or from another server node to the metadata server 120. The client 110 and the other server node can also be checking for heartbeats from the metadata server 120. A second timeout period that is shorter than the first (RPC) timeout period is associated with the health check message and heartbeats.

In block 806 of FIG. 8, in one embodiment, the health check message times out, or a lack of heartbeats from the metadata server 120 is detected.

In block 808, with reference also to FIG. 6, an alert message 602 is sent from device (e.g., either the client 110 or another server node) that issued the health check message to the metadata server 120 or that is monitoring the heartbeats from the metadata server 120. The alert 602 is sent to the central management server in response to the timing out of the health check message or in response to a lack of heartbeats from the metadata server 120. The alert 602 serves to notify the central management server of such a condition. In response to the alert 602, the central management server can optionally verify whether the metadata server 120 is inoperative.

In block 810, the pending RPC request is canceled. As noted, the RPC request can be canceled when the health check message times out, or when a lack of heartbeats is detected, or when the alert 602 is sent, or when a message 604 is received from the central management server.

In block 812, an address for at least one alternate, healthy (second) server is identified. The address(es) for the alternate server or servers may be identified in the message 604 sent from the central management server to the client 110, or the client may select the address(es) from a list that the client possesses.

In block 814 of FIG. 8, with reference also to FIG. 6, the client 110 can reissue and resend the RPC request to an alternate metadata server. If there are multiple RPC requests, they can all be sent to the same metadata server or they can be distributed amongst multiple metadata servers.

In one embodiment, the flowchart 800 proceeds from either block 802 or block 804 directly to block 816. In block 816, instead of receiving a message 604 from the central management server in response to an alert message 602 (FIG. 6) as described above, the client 110 receives the message 604 proactively from the central management server. In other words, the client 110 may be instructed to stop sending RPC requests to the metadata server 120 regardless of whether the client sent an alert to the central management server—regardless of whether an RPC request or a health check message request times out or a lack of heartbeats is detected. Such a step may be taken for load balancing purposes, for example. From block 816, the flowchart 800 returns to block 810.

Figure 9:
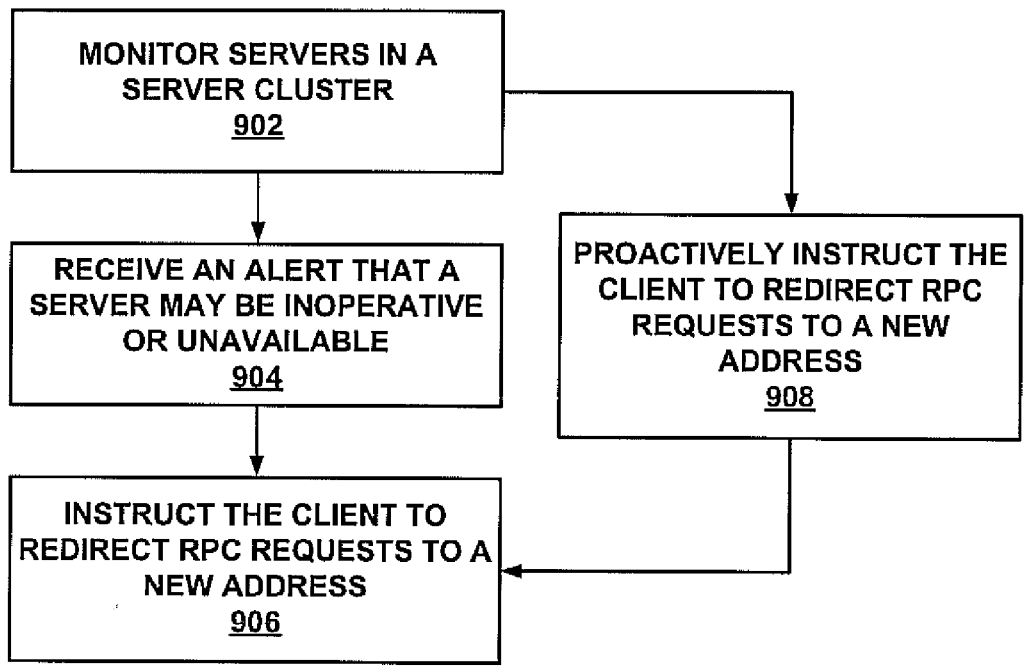
FIG. 9 is a flowchart of a computer-implemented method for managing a server cluster according to an embodiment of the invention.

FIG. 9 is a flowchart 900 illustrating an embodiment of a computer-implemented method for managing a server cluster. Flowchart 900 can be implemented as computer-executable instructions residing on some form of computer-readable storage medium (e.g., in the system 210 of FIG. 3). More specifically, the method described by the flowchart 900 can be performed by the central management server of FIG. 2 (e.g., by the metadata server 122). Not all of the steps included in the flowchart 900 may be performed, and the steps may be performed in a different order than described.

In block 902 of FIG. 9, with reference also to FIG. 2, the statuses of metadata server nodes 120-122 are monitored. The monitoring can include measurements of performance parameters such as CPU usage and bandwidth. The server nodes 120-122 can also send heartbeat messages to one another. In one embodiment, a central management server can send health check messages to the other server nodes 120-121. In one embodiment, the client 110 can send health check messages to its assigned metadata server (e.g., metadata server 120).

In block 904 of FIG. 9, with reference also to FIG. 6, the central management server receives an alert 602. The alert 602 indicates to the central management server that one of the server nodes or the client 110 did not receive a timely response to a health check message from the metadata server 120. The alert may also or instead indicate that the client 110 did not receive a timely response to an RPC request. The alert may also or instead indicate that the metadata server 120 has stopped sending heartbeat messages. The alert may be issued by the client or by any of the metadata servers in the server cluster.

In block 906 of FIG. 9, with reference also to FIG. 6, the central management server can send a message 604 to the client 110 in response to the alert 602. The message 604 can be used to instruct the client 110 to cancel pending RPC requests to the metadata server 120 and to redirect those requests to one or more other metadata servers.

In one embodiment, the flowchart 900 of FIG. 9 proceeds to block 908 from block 902. In block 908, based on the monitoring performed by the central management server as described above, the central management server proactively makes a decision to send the message 604 (FIG. 6) described above. In other words, the central management server may instruct the client 110 to stop sending RPC requests to the metadata server 120 regardless of whether an RPC request or a health check message times out, and regardless of whether the central management server receives an alert 602 from the client 110. Such a step may be taken for load balancing purposes, for example.

In summary, according to embodiments of the present disclosure, heartbeat and health check messages with shorter timeout periods and shorter roundtrip times relative to remote procedure calls can be used to monitor the health of metadata servers. In particular, the heartbeat and health check messages can be used to quickly determine whether a server node assigned to a particular client is inoperative.

The central management server monitors the performance of other server nodes, so that one or more properly functioning server nodes can be quickly identified to the client to replace the inoperative server node. Once the client obtains the network address of the healthy server node(s), it aborts all outstanding RPC requests made over the session to the failed server node, and reissues the RPC requests over a new session to the healthy server node or nodes. As a result, the client can access files faster in the event of a server node failure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A computer-implemented method for managing a server cluster, said method comprising:
   issuing a remote procedure call (RPC) request, via at least one computer processor in a client device, from the client device to a first server for processing said RPC request, wherein said first server is located in said server cluster apart from said client device and wherein said server cluster comprises metadata servers that are coupled to a plurality of data servers;
   adding, via said at least one computer processor, an entry for said RPC request to an RPC table on said client device;
   receiving, at said client device, a message that said first server is inoperative, wherein said message is received from a central management server responsible for monitoring server health in said server cluster and wherein said message is sent in response to an alert to the central management server, wherein said alert indicates said first server has not responded to a health check message issued by said client device, said health check message having a timeout period that is shorter than a timeout period for said RPC request; and
   in response to receiving said message, said client device canceling said RPC request, by clearing said RPC request from said RPC table, and then said client device reissuing, via said at least one computer processor, said RPC request to a second server for processing said RPC request, wherein said second server is located in said server cluster apart from said client device.

2. The computer-implemented method of claim 1 further comprising:
   monitoring status of servers in said server cluster; and
   selecting said second server based on said monitoring.

3. The computer-implemented method of claim 1 wherein said alert indicates said first server has stopped sending heartbeat messages to said client device.

4. The computer-implemented method of claim 1 wherein said metadata servers are coupled to the plurality of data servers via a local area network.

5. A non-transitory computer-readable storage device having computer-executable instructions for causing a computer system to perform a method of managing remote procedure calls, said method comprising:
   sending, via at least one computer processor of the computer system, a remote procedure call (RPC) request having a first timeout period associated therewith to a first server for processing said RPC request, wherein said first server is located in a server cluster apart from said computer system and wherein said server cluster comprises metadata servers that are coupled to a plurality of data servers;
   adding an entry for said RPC request to an RPC table stored on said computer system;
   receiving, at said computer system, a message that said first server is inoperative based upon a health check message to said first server, said health check message having a second timeout period associated therewith that is shorter than said first timeout period, wherein said message is received from a central management server responsible for monitoring server health in said server cluster and wherein said message is sent in response to an alert to the central management server, wherein said alert indicates said first server has not responded to said health check message issued by said computer system;
   in response to receiving said message, canceling said RPC request to said first server by clearing said RPC request from said RPC table before said first timeout period expires if a response to said health check message is not received within said second timeout period; and
   after said canceling, resending said RPC request from said computer system to a second server for processing said RPC request, wherein said second server is located in said server cluster apart from said computer system.

6. The non-transitory computer-readable storage device of claim 5 wherein said method further comprises notifying the central management server if said response to said health check message is not received within said second timeout period.

7. The non-transitory computer-readable storage device of claim 6 wherein said method further comprises receiving address information for a server in response to said notifying.

8. The non-transitory computer-readable storage device of claim 5 wherein said message further comprises address information.

9. The non-transitory computer-readable storage device of claim 5 wherein said method further comprises canceling all pending RPC requests to said first server if said response to said health check message is not received within said second timeout period.

10. The non-transitory computer-readable storage device medium of claim 5 wherein said method further comprises:
   accessing a list of a plurality of servers; and
   selecting said second server from said list.

11. The non-transitory computer-readable storage device of claim 5 wherein said metadata servers are coupled to the plurality of data servers via a local area network.

12. A computer-implemented method for managing a server cluster, said method comprising:
   issuing, via at least one computer processor of a client device, a remote procedure call (RPC) request from the client device to a first server for processing said RPC request, wherein said first server is located in said server cluster apart from said client device and wherein said server cluster comprises metadata servers that are coupled to a plurality of data servers;
   adding, via said at least one computer processor, an entry for said RPC request to an RPC table on said client device;
   said client device determining, via said at least one computer processor, that said first server is inoperable based upon said client device receiving a message that said first server is inoperative, wherein said message is received from a central management server responsible for monitoring server health in said server cluster and wherein said message is sent in response to an alert to the central management server, wherein said alert indicates said first server has not responded to a health check message issued by said client device, said health check message having a timeout period that is shorter than a timeout period for said RPC request; and
   in response to said determining, said client device canceling said RPC request by clearing said RPC request from said RPC table, and then said client device reissuing said RPC request to a second server for processing said RPC request instead of to said first server, wherein said second server is located in said server cluster apart from said client device.

13. The computer-implemented method of claim 12 wherein said determining comprises determining that said first server has stopped sending heartbeat messages, said heartbeat messages having a detection period that is shorter than the timeout period for said RPC request.

14. The computer-implemented method of claim 12 wherein said metadata servers are coupled to the plurality of data servers via a local area network.

* * * * *